March 2, 1948.  G. D. WYBLE  2,437,062
WIND SCREEN
Filed Nov. 1, 1945
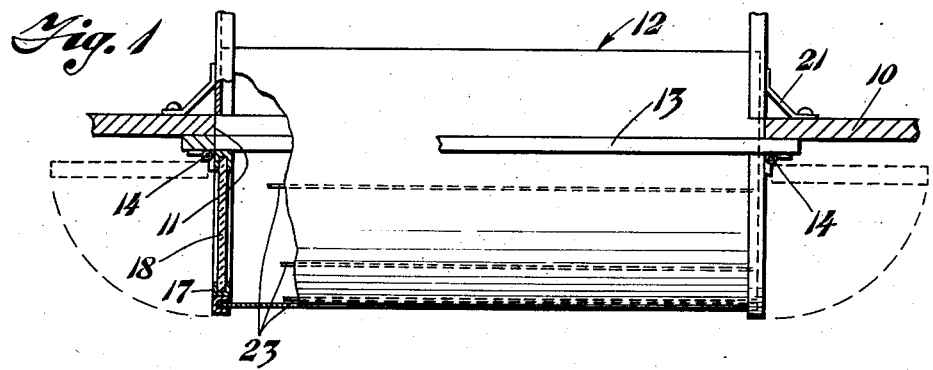
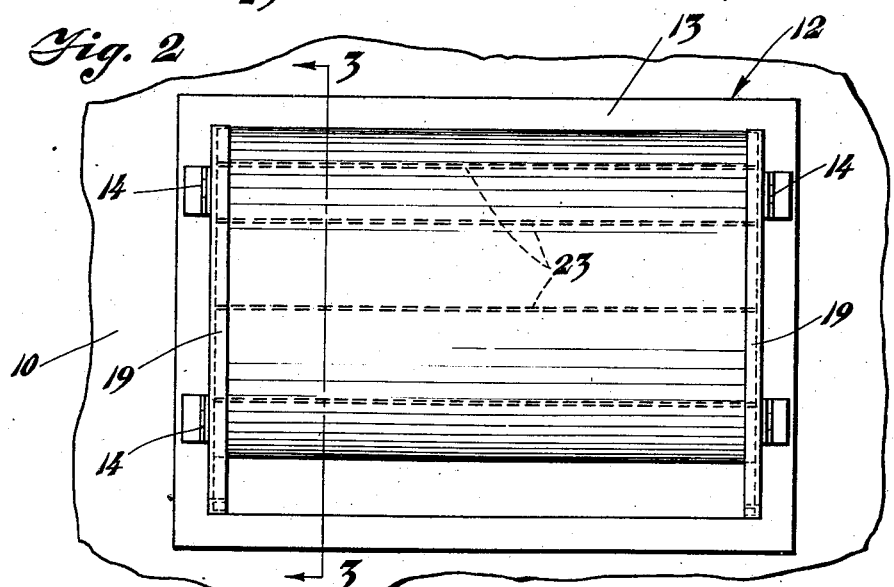
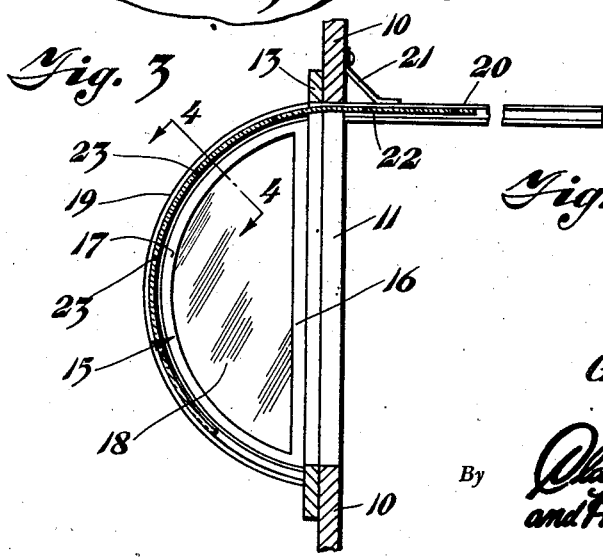
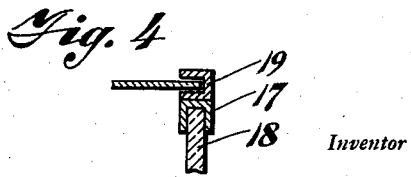
Inventor
Glen D. Wyble
By Clarence A. O'Brien
and Harvey B. Jacobson
Attorneys Patented Mar. 2, 1948

2,437,062

UNITED STATES PATENT OFFICE 2,437,062

WIND SCREEN

Glen D. Wyble, Maywood, Calif.

Application November 1, 1945, Serial No. 626,037

2 Claims. (Cl. 160—91)

This invention relates to a wind screen for attachment to the windows of a cab of a locomotive and has for its primary object to protect the operator from the elements and at the same time provide clear vision both forward, to the side, and to the rear of the cab.

Another object is the provision of an attachment which may be folded into compact space when not in use and leaves the window opening entirely unobstructed.

Among its features my invention embodies a pair of spaced frames carrying transparent panels and having guide channels in which a flexible member of transparent material is slidably mounted to enclose the window opening to afford protection to the operator.

In the drawings:

Figure 1 is a horizontal sectional view through the wall of the cab of a locomotive showing my improved attachment in place, certain portions of the device being broken away to more clearly illustrate the details of construction, Figure 2 is a side view of Figure 1, Figure 3 is a vertical sectional view taken on the line 3—3 of Figure 1, and Figure 4 is a detailed sectional view taken on the line 4—4 of Figure 3.

Referring to the drawings in detail, a wall 10 forming one of the side walls of the cab of a locomotive is provided with a window opening 11 which is adapted to be inclosed by my improved wind screen designated generally 12.

The wind screen 12 comprises a rectangular frame 13 of a size substantially equal to that of the window opening 11. Hinged as at 14 to the vertical side rails of the frame 13 is a pair of screen frames designated generally 15 each of which comprises a vertical channel 16 the upper and lower ends of which are joined by an arcuate channel 17 and fitted in the channels 16 and 17 is a panel 18 of transparent material such as glass. Welded or otherwise secured to the bight portion of the channel 17 and following the arcuate contour thereof is a guide channel 19 the opened side of which is perpendicular to that of the channel 17.

As will be noted in Figure 3, the channels 17 and 19 terminate at points substantially tangential to the horizontal and arranged in alignment with the upper ends of the channels 19 on the inside of the window opening 11 are horizontally extending guide channels 20 which are held in place to the cab wall 10 by means of suitable brackets 21. The forward ends of these guide channels align with the upper ends of the channels 19 and slidably arranged in the guide channels 19 and 20 is a panel 22 of a suitable flexible transparent material such as is commonly found on the general market. It will be noted that the upper ends of the channels 19 and the outer ends of the channels 20 are slightly below the upper wall of the window opening 11 so as to allow the flexible panel 22 to freely slide therethrough.

In operation when it is desired to use the device to protect an engineer or other operator of the locomotive from the elements the frames 15 are swung outwardly on their hinges 14 to a position perpendicular with the side of the cab wall 10, as illustrated in Figures 1 to 3 inclusive. In this position the guide channels 19 align with the guide channels 20 and the flexible panel 22 may then be pulled from the guide channels 22 into the channels 19 and downwardly following the curvature of the channels to the bottom of the frame 13 so as to afford a complete enclosure for the window opening 11. Due to the transparency of the panels 18 and of the flexible member 22 it will be obvious that clear vision may be had both to the front and rear of the locomotive as well as through the sides. Thus the engineer may lean out of the window opening 11 and yet be completely protected from the elements.

When it is desired to have the window opening 11 completely open the flexible panel 22 may be elevated to slide horizontally in the channels 20 which it is to be understood will be made long enough to support the full length of the flexible member. If so desired suitable reinforcing strips 23 may be embedded at spaced intervals in the flexible member 22 to prevent it sagging when supported horizontally between the channels 20. Having disposed of the flexible member in a horizontal position between the channels 22 the frames 15 may be swung on their hinges 14 into the dotted line position illustrated at Figure 1 which results a clear unobstructed window opening 11.

Should it be found desirable a windshield wiper of conventional construction may be attached to the vertical bar 16 of each frame 15 to operate over the transparent panel 18 supported therein.

While in the foregoing there has been shown and described the preferred embodiment of this invention it is to be understood that minor changes in the details of construction, combination, and arrangement of parts may be resorted to without departing from the spirit and scope of the invention as claimed.

What I claim is:

1. The combination with the side wall of the cab of a locomotive having a window opening therein, of a wind screen for inclosing said opening with obstructing clear vision therethrough which comprises a frame adapted to be attached to the outer face of the wall of the cab adjacent the window opening, an arched frame hinged to each vertical side bar of the first mentioned frame and extending outwardly from the outer side thereof, a transparent panel in each hinged frame, and a flexible member of transparent material carried between the hinged frames and adapted to form a convex housing to protect the operator of the locomotive from the elements when he is occupying the normal driving position in the locomotive cab.

2. The combination with the side wall of the cab of a locomotive having a window opening therein, of a wind screen for inclosing said opening without obstructing clear vision therethrough which comprises a frame adapted to be attached to the outer face of the wall of the cab adjacent the window opening, a frame hinged to each vertical side bar of the first mentioned frame and extending outwardly from the outer side therefore, a transparent panel in each frame, and a flexible member of transparent material carried between the frames and adapted to form a convex housing to protect the operator of the locomotive from the elements when he is occupying the normal driving position in the locomotive cab, and horizontally extending members at and perpendicular to the upper end of the window opening between which the flexible transparent member is adapted to be supported when the window is to be wholly open.

GLEN D. WYBLE.

REFERENCES CITED

The following references are of record in the file of this patent:

UNITED STATES PATENTS

| Number | Name | Date |
|---|---|---|
| 1,729,825 | Gaiser | Oct. 1, 1929 |